(12) United States Patent
Queau et al.

(10) Patent No.: US 9,291,289 B2
(45) Date of Patent: Mar. 22, 2016

(54) COMPOSITE HOSE AND METHOD FOR FABRICATING SUCH A HOSE

(75) Inventors: Jean-Pierre Queau, Nice (FR); Philippe Albert Christian Menardo, Nice (FR); Giorgio Torre, Nice (FR)

(73) Assignee: TRELLEBORG INDUSTRIE SAS, Clermont-Ferrand (FR)

( * ) Notice: Subject to any disclaimer, the term of this patent is extended or adjusted under 35 U.S.C. 154(b) by 1127 days.

(21) Appl. No.: 13/256,744

(22) PCT Filed: Mar. 17, 2010

(86) PCT No.: PCT/EP2010/053477
§ 371 (c)(1),
(2), (4) Date: Sep. 15, 2011

(87) PCT Pub. No.: WO2010/106110
PCT Pub. Date: Sep. 23, 2010

(65) Prior Publication Data
US 2012/0012221 A1    Jan. 19, 2012

(30) Foreign Application Priority Data

Mar. 18, 2009 (EP) .................................... 09155431

(51) Int. Cl.
*F16L 9/18* (2006.01)
*F16L 9/14* (2006.01)
*F16L 11/08* (2006.01)
*F16L 59/14* (2006.01)

(52) U.S. Cl.
CPC ............. *F16L 11/082* (2013.01); *F16L 59/141* (2013.01)

(58) Field of Classification Search
CPC ............................ F16L 11/082; F16L 59/141

USPC .................................. 138/111–114, 149, 148
See application file for complete search history.

(56) References Cited

U.S. PATENT DOCUMENTS

| 2,610,028 | A | * | 9/1952 | Smith ..................... E21B 17/00 138/148 |
| 3,547,161 | A | * | 12/1970 | Boyle et al. ................... 138/114 |
| 3,581,775 | A | * | 6/1971 | Dahl ......................... F16L 9/18 138/104 |
| 4,046,407 | A | * | 9/1977 | Porreco ..................... 285/123.17 |

(Continued)

FOREIGN PATENT DOCUMENTS

| GB | 366 370 A | 2/1932 |
| GB | 1 447 175 A | 8/1976 |

(Continued)

OTHER PUBLICATIONS

International Search Report, dated Nov. 17, 2010, from corresponding PCT application.

*Primary Examiner* — Patrick F Brinson
*Assistant Examiner* — Matthew Lembo
(74) *Attorney, Agent, or Firm* — Young & Thompson

(57) ABSTRACT

A composite hose for transfer of cryogenic fluids, includes two end flanges, a helical wound inner wire several layers of protective fabric layers, at least one gas-tight sealing layer sandwiched between one or more protective layers and an outer helical wound wire which is placed on top of the protective layers between the pitch of the inner wire, characterized in that the inner wire is connected to a flexible inner liner that follow any axial and/or radial displacement of the inner wire and that covers the inner corrugations of the composite hose so to create a smooth inner bore of the composite hose.

11 Claims, 7 Drawing Sheets

(56) References Cited

U.S. PATENT DOCUMENTS

| | | | |
|---|---|---|---|
| 4,502,714 A * | 3/1985 | Brown et al. | 285/47 |
| 5,778,940 A | 7/1998 | Tucker et al. | |
| 5,918,641 A | 7/1999 | Hardy et al. | |
| 6,094,922 A * | 8/2000 | Ziegler | 62/50.7 |
| 6,186,181 B1 | 2/2001 | Schippl | |
| 7,013,935 B1 * | 3/2006 | Bonn | 141/311 A |
| 7,441,602 B2 * | 10/2008 | Saint-Marcoux | 166/302 |
| 8,267,433 B2 * | 9/2012 | Lange | F16L 39/005 285/123.1 |
| 2002/0089177 A1 | 7/2002 | Bonn | |
| 2002/0185188 A1 * | 12/2002 | Quigley et al. | 138/137 |
| 2008/0006337 A1 * | 1/2008 | Quigley | F16L 9/19 138/125 |
| 2009/0261578 A1 * | 10/2009 | Lange et al. | 285/123.12 |

FOREIGN PATENT DOCUMENTS

| | | | |
|---|---|---|---|
| GB | 2 370 336 A | 6/2002 | |
| GB | 2370336 A | 6/2002 | |
| JP | H01111892 U | 7/1989 | |
| JP | H0490786 U | 8/1992 | |
| JP | 5-500686 | 2/1993 | |
| JP | H11325333 A | 11/1999 | |
| JP | 2002188761 A | 7/2002 | |
| JP | 2005 083422 A | 3/2005 | |
| JP | 2005-155668 | 6/2005 | |
| JP | 2006-077952 | 3/2006 | |
| WO | 2006-062030 | 6/2006 | |
| WO | WO 2007065492 A1 * | 6/2007 | F16L 39/005 |
| WO | 2008/017868 A2 | 2/2008 | |
| WO | 2008/071637 A2 | 6/2008 | |

* cited by examiner

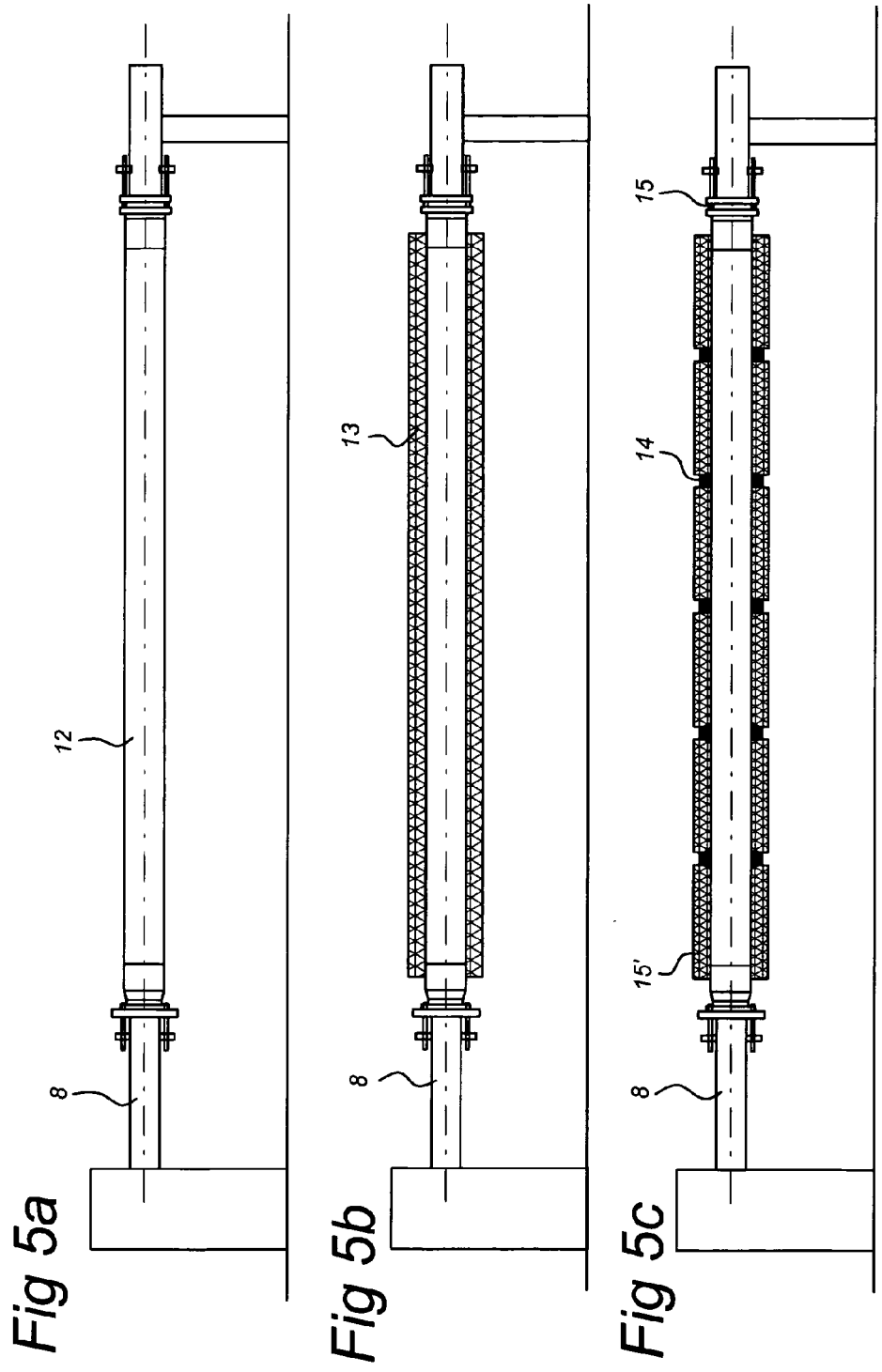

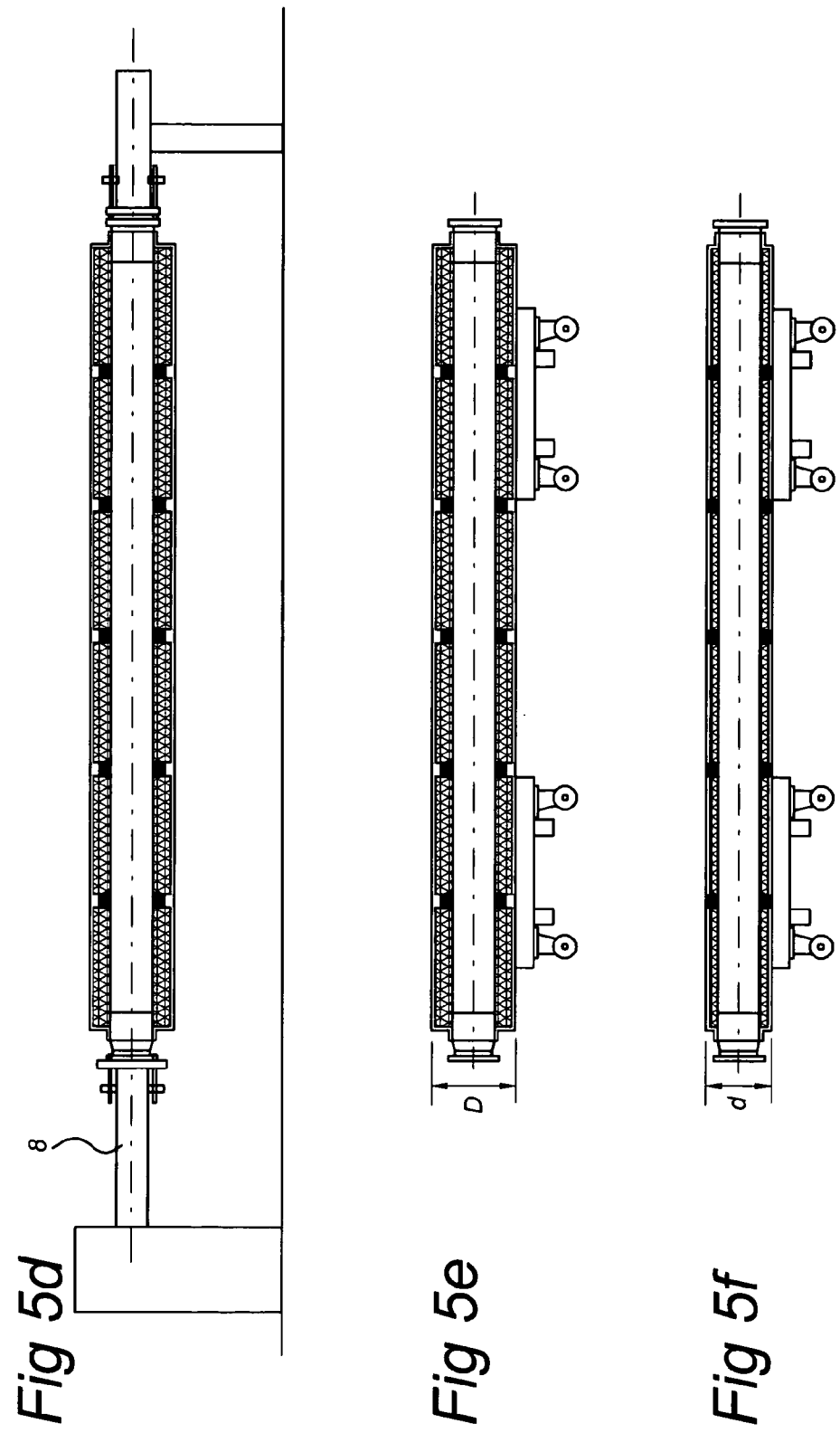

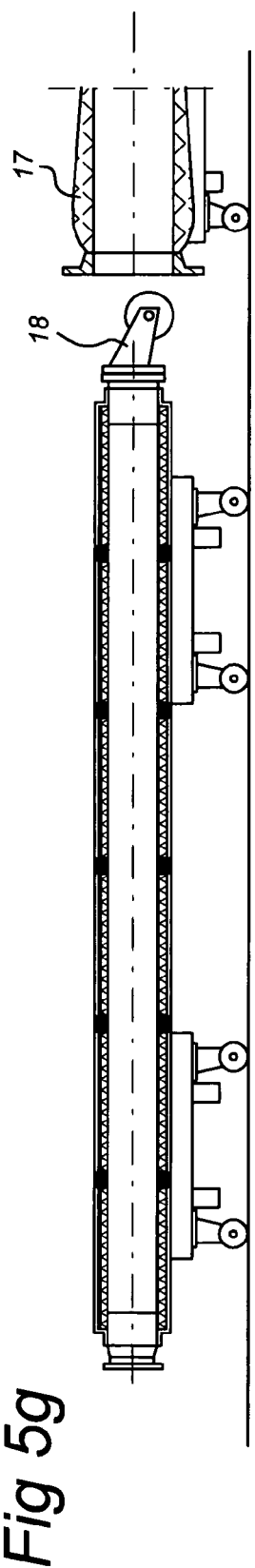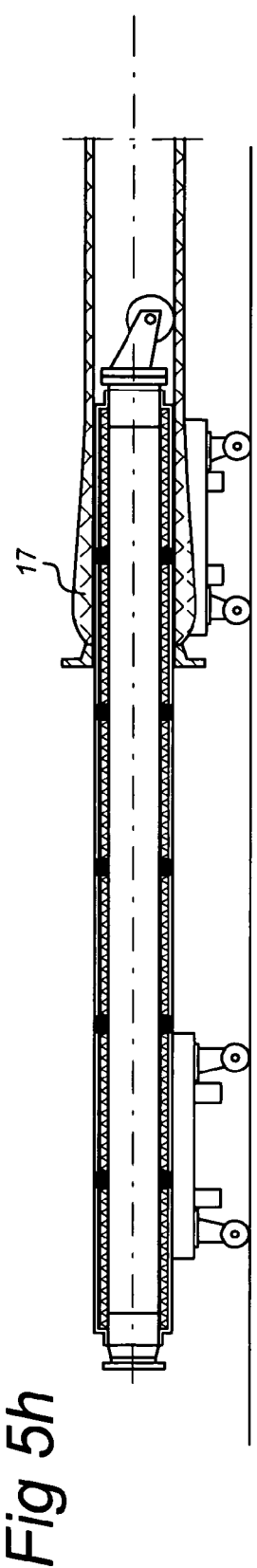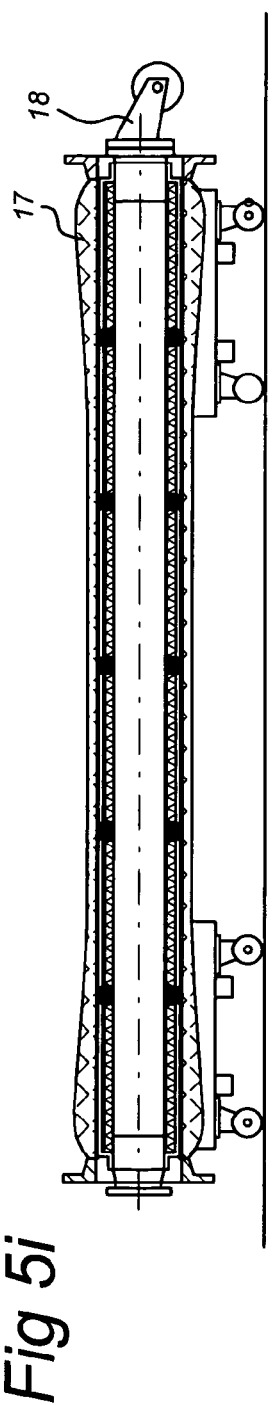

COMPOSITE HOSE AND METHOD FOR FABRICATING SUCH A HOSE

Applicant claims priority of the European patent application 091554311 filed on the 18 Mar. 2009.

This invention relates to a composite hose for transfer of cryogenic fluids and to a method for fabricating such a composite hose. The invention also relates to the use of such a composite hose in a cryogenic transfer hose-in-hose configuration.

Patent publication U.S. Pat. No. 6,186,181 in the name of Alcatel, discloses a flexible line pipe which comprises an inner corrugated metal tube, an outer corrugated metal tube located at some distance from the inner tube and a spacer as well as an insulation material between the inner and the outer metal tubes. The spacer comprises two cords made of fiber-reinforced plastic applied to the inner tube and wrapped in opposite directions. In the ring-shaped gap between the tubes a pressure is created that is less than atmospheric pressure; between $10^{-3}$ and $10^{-1}$ mbar. The insulation material in the gap is a fleece material. Fleece material instead of solid insulation materials or multi layered compressed materials is used as this material combines low heat transfer capacities (a good insulator) with the possibility of a quick evacuation of the gap between the two metal corrugated tubes. Evacuation or under pressurization of the gap is preferred above the use of a super-insulation material in the gas, as it is the best way to isolate the highly conductive outer corrugated metal tube from the highly conductive inner corrugated metal tube.

The main drawbacks of such flexible pipes is that they may be acceptable for aerial hoses in a more static environment but can be hazardous when used as floating or submerged LNG transfer hoses due to the danger of seawater ingress in the openings or (micro-) cracks at the welds. Further, the bend radius of a LNG transfer system with corrugated inner and outer tubes is further relatively large which does not comply with the waves and should be controlled and restricted at all times to avoid situations were it could be overstretched as this will lead to permanent deformations of the outer tube and creation of openings or cracks in the outer corrugated tube.

In patent application WO2008071637 filed by the applicant, there is provided a cryogenic transfer hose which can be used in a dynamic offshore environment, such as in aerial conditions at sea under wind and wave-induced movements, and preferably as a floating or submerged cryogenic transfer hose.

In this application, applicant also describes a method of constructing (i e manufacture and/or repair) of a cryogenic transfer hose in which an inner and outer hose can be quickly and accurately aligned, which can be adjusted easily in length.

It is an object of the present invention to provide an improved method for fabricating an improved composite hose for transfer of cryogenic fluids, and an improved cryogenic transfer hose-in-hose configuration based on such and composite hose.

Fluids in motion are subjected to various resistances, which are due to friction. Friction may occur between the fluid and the pipe work. The inner roughness of the pipe can create eddy currents. This increases the friction between the pipe wall and the fluid. As the inner hose may be a flexible cryogenic corrugated metal hose, the depth and pitch of the internal convolution are composing a surface geometry which is a succession of obstacles for the fluid flowing inside, generating substantial wall friction and consequently high pressure drop in the hose.

It is a further object of the present invention to reduce pressure drop of such hoses by adding a smoother internal geometry into the hose partially or totally covering the initial hose construction geometry, without loosing its flexibility and extension properties, thus reducing the wall friction and reducing the pressure drop when cryogenic fluids are transferred. This avoid the creation of gas (boil off gas) out of the cryogenic liquids, especially if the composite hoses are assembled together for example in a long floating or submerged LNG transfer line of several hundreds meter between two offshore placed vessels.

It is another object of the invention to provide a cryogenic transfer hose comprising an inner composite hose as mentioned above, an outer hose arranged around the inner hose in a concentric manner and a spacer member bridging an annular gap between the inner and outer hoses, an insulation material contiguous to the inner and the outer hoses and being comprised in the annular gap between the two hoses and a continuous optical fiber wrapped on top of the insulation layer to detect cryogenic liquid leaks.

The method to fabricate a transfer cryogenic hose according to the present invention comprises the following steps of:

Placing and securing the end-fittings on a mandrel
Install a non removable inner liner
Wind the inner wire at the requested pitch on the fitting and along the mandrel
Securing the wire on each end of the hose by welding
Put some adhesive means between the inner wire scrolls
Wind layers of fabric
Wind PP films, and tension the films to keep included air to minimum
Apply another fabric layer (that will be fold back for PP films welding)
Wind a rope or a belt so that it locates between the inner wire coils
Weld the PP films
Wind the outer wire so that it locates between the inner wire coils
Place a ferrule, and fix it so that it secures the outer wire
Wrap an insulating material around the inner composite hose
Place stiffeners on top of the insulation layer to keep the insulation layer continuous
Wrap an optical fiber on top of the insulation layer
Place an airtight sleeve around the inner composite hose
Evacuate the air from the airtight sleeve
Remove the mandrel
Insert the inner hose into the outer hose
Reintroduce some air into the airtight sleeve
Place the end flanges around the inner hose and interconnect them with outer hose During fabrication, it is a key issue that the different components and layers of the inner composite hose are secured as tight as possible against the mandrel one step after the other. This prevents a shift, or is necessary to keep included air to a minimum (e.g. when winding the PP films), have a regular diameter... The same condition applies for the fabrication of the outer hose.

The inherent problem to this condition is that once the inner hose is ready to be slide in the outer hose, it has first to be removed from its mandrel while being very tightly fixed on it. The removal of the inner hose mandrel is then a difficult and time-consuming issue.

It is therefore another object of the present invention to provide an expandable mandrel for the fabrication of a composite hose allowing an easy removal operation of the hose from the mandrel.

Some aspects of different embodiments according to the invention will by way of example be described with reference to the accompanying drawings. In the drawings:

FIG. 1 shows a longitudinal cross-sectional view of a composite transfer hose of the present invention.

FIGS. 2a and 2b show schematic cross sectional view of an end-fitting design comprising pressure relief systems for a composite hose according to the present invention FIGS. 3a and 3b show two different welding solutions for the inner welded liner installation FIGS. 4a and 4b show a snap-on inner liner according to the present invention FIGS. 5a-5i show the consecutive steps of assembling a hose-in-hose segment for use in a cryogenic transfer hose according to the present invention.

Figure 1:
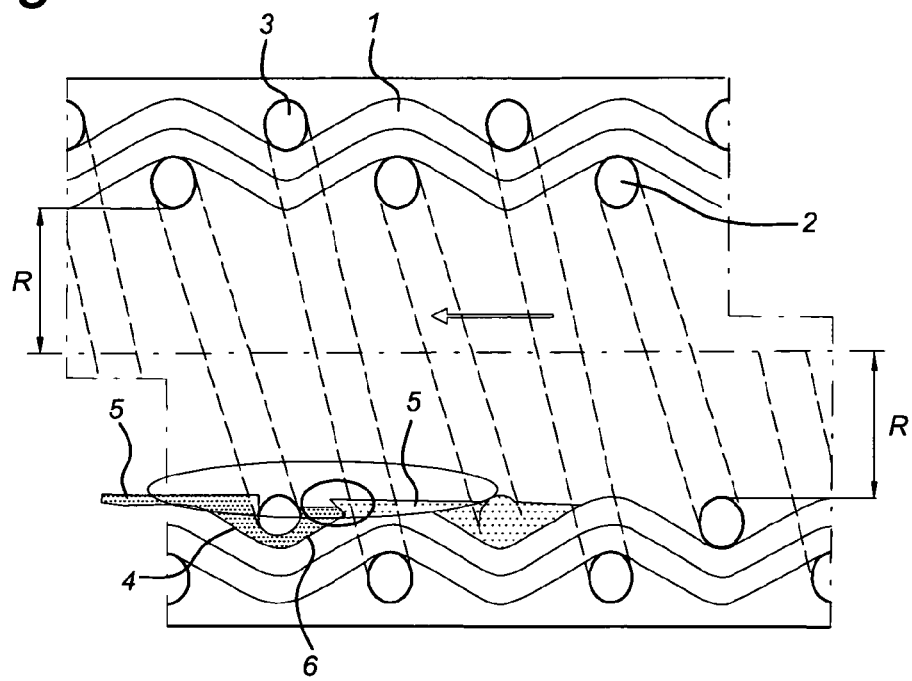

FIG. 1 shows a longitudinal cross-sectional view of a composite transfer hose of the present invention. In this figure it is clearly shown that fabrics layers 1 are sandwiched between an inner wire 2 and an outer wire 3, the outer wire 3 being located between the inner wire pitches. It appears also clearly that the inner surface of the composite hose is hence not flat but corrugated and presents many obstacles to the fluid. At the bottom of the figure, a self clamping or snap-on, elongated inner strip or shell 4 has been installed on the inner wire 2, each flange 5 overlapping the adjacent one 6 so that it offers a flat inner surface to the composite hose.

FIG. 2 shows the pressure relief systems provided in the annulus of the cryogenic hose end fitting.

As already shown in the international patent application WO2009/127650 filed by the applicant, the end fitting design for a composite hose according to the present invention provides a leak free connection between the end fitting and the composite hose, and is able to take up the axial forces acting on the composite hose. The end fitting 41 is of a compact design and has an overall reduced radial outer diameter and is relatively light. This is advantageous as the reduced weight and dimensions of the complete end fitting is important for aerial hoses as well as for composite hoses that are used as an inner hose 39 to be placed into an outer hose 40 for a hose-in-hose cryogenic fluid transfer system. However as the composite hose is used to transfer cryogenic fluids, depending on the type of material used a little permeation can happen. If the material chosen is a porous polymer, an infinitesimal quantity of cryogenic fluid can be trapped in the polymer. Hence during warming up of the transfer hose after an offload of cryogenic fluid, the trapped cryogenic fluid will quickly expand resulting in a pressure increase. Such excess of pressure can be dealt with by using pressure relief systems to route the excess of pressure either in the hose itself, in the annulus when the hose is used as an inner hose of a hose-in-hose cryogenic fluid transfer system or even directly into the external environment, outside the hose or outside the hose-in-hose.

Figure 2A:
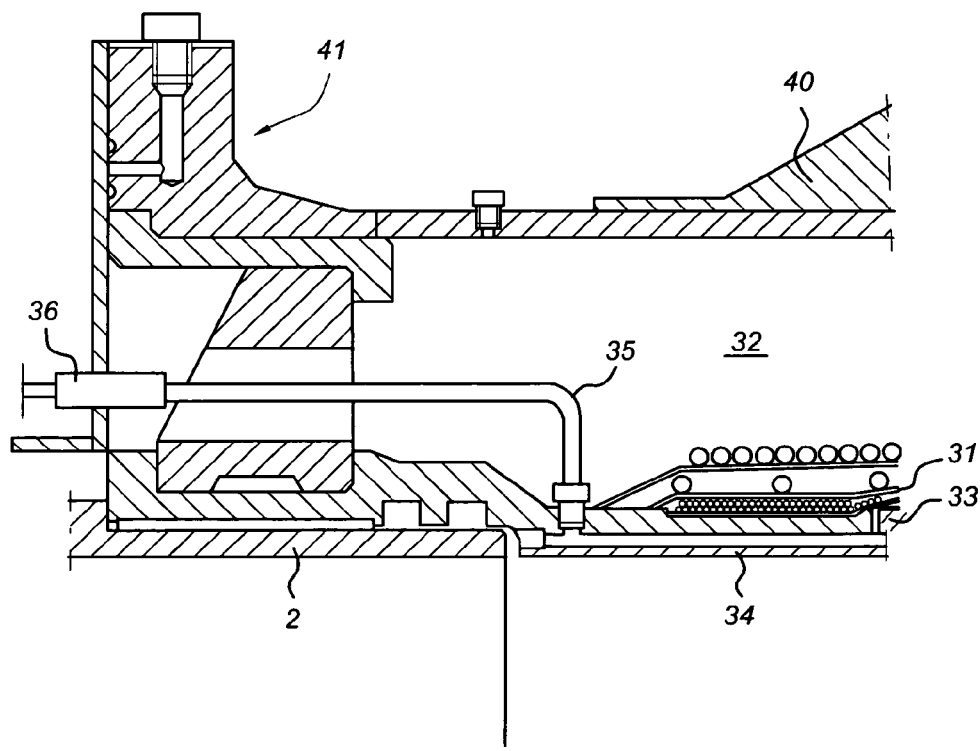
Figure 2B:
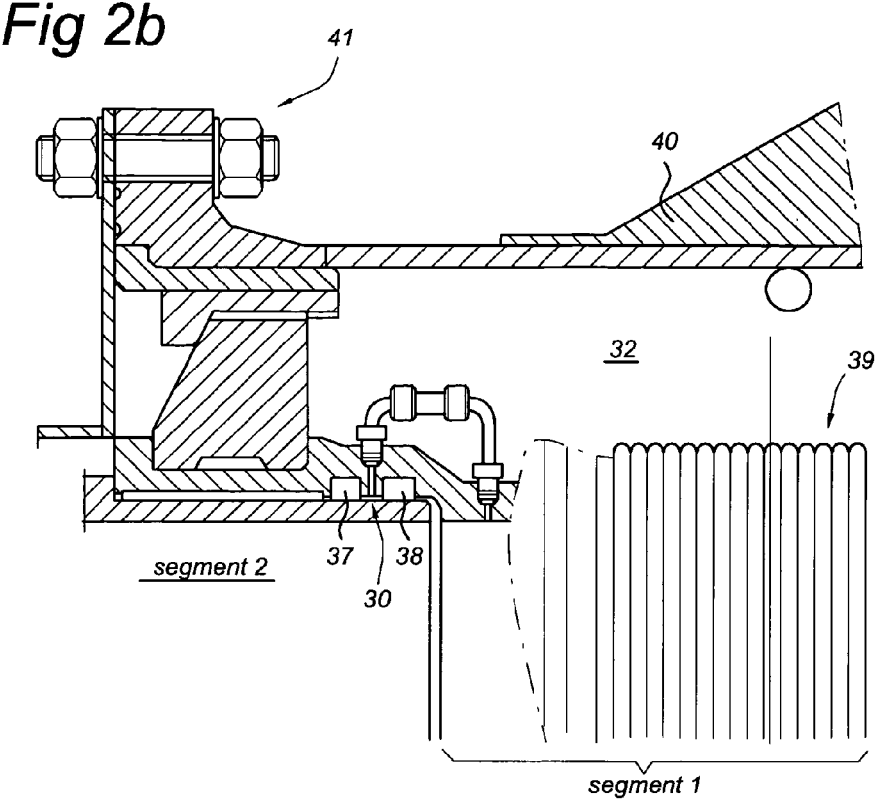

According to the embodiment shown in FIG. 2 the pressure relief system such as a check valve (FIG. 2b) or a pressure relief valve (FIG. 2a) is installed in the annular gap 32, the space between the outer 40 and the inner hose 39. However, it could be integrated in the end fittings of the inner hose itself by using more miniaturized components adapted for cryogenic conditions.

FIG. 2a shows a pressure relief system installed to prevent an excess pressure within the sealing area of the inner hose and its end fitting that can have one or more valves being used in parallel. In the embodiment shown in FIG. 2a, if the pressure between the film packs 31 of one or more sealing layers increases and gets higher than the set point of the valve, the valve opens and releases the excess of pressure coming from the volume enclosed by two film packs 31 in the annular gap 32. In FIG. 2a the pressure relief system is composed of a fluid passage 33 extracting fluid from the volume enclosed by the two film packs 31 and ending in an orifice 34. The orifice 34 bridges the fluid passage 33 with the relief tube 35 that leads the excess of pressure towards a pressure relief valve 36 that will free the excess of pressure into the annular gap 32.

FIG. 2b shows a pressure relief system installed to prevent an excess pressure between seals 37, 38. In FIG. 2b seal 37 is a primary seal used to ensure tightness between two hose segments and seal 38 is used as a secondary seal or back-up seal. These seals can be piston seal with no outer lips so to avoid leaking when cooling down, and keep the seal's efficiency in cryogenic conditions. In FIG. 2b the pressure relief system is composed of a check valve installed so that it opens only when it is needed to release excess of pressure that could be applied on one seal by routing this excess of pressure from the sealing area of two hose segments shown at location 30, between the seals 37 and 38 back into the inner hose flow path.

Figure 3A:
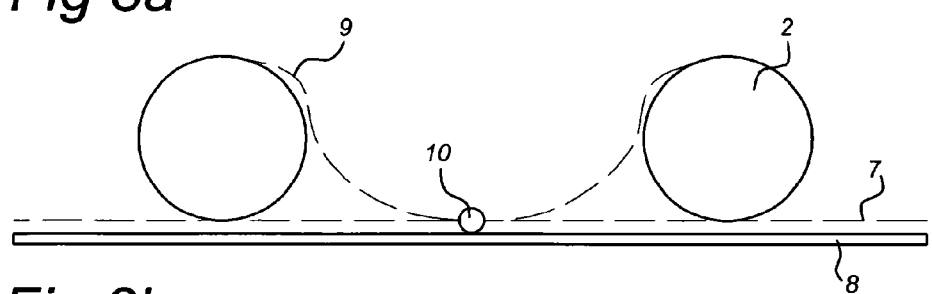

FIG. 3 shows two different welding solutions for the inner welded liner installation. The main purpose of the inner liner is to reduce pressure drop of the transfer hose by adding a smoother internal geometry. Another purpose is to lock the inner wire so when there is an overpressure or reverse fluid flow, the inner wire will not be pushed away or shift axially along the hose. To reduce the friction factor of the hose, the manufacturing procedure is modified in the following way: a layer of fabric material 7 is directly wrapped on the mandrel 8. The fabric 7 may be coated to have better friction reducing properties. The inner wire 2 is then wound on the mandrel 8, followed by an additional layer of fabric 9. In between two adjacent wires, the two layers of fabric are welded together 10.

Figure 3B:
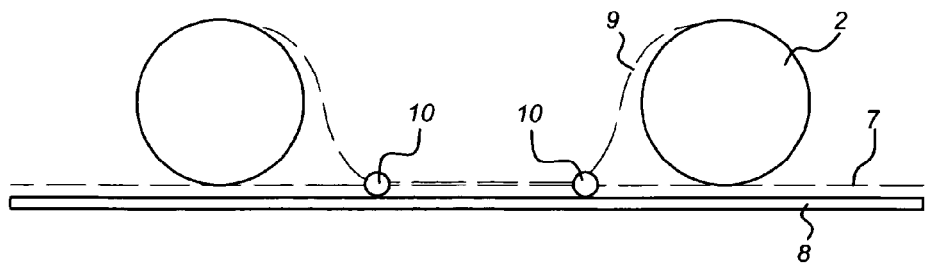

There are two solutions proposed to weld the two layers 7, 9 together: continuous or spot. There may also be only one weld (FIG. 3a) or two welds (FIG. 3b). As shown, if only one weld 10 is present then it can be at the center between the adjacent wires; if two welds are present, then each is close to a wire. After the weld is made, the hose manufacturing continues as usual, following the steps mentioned in the method above.

Figure 4A:
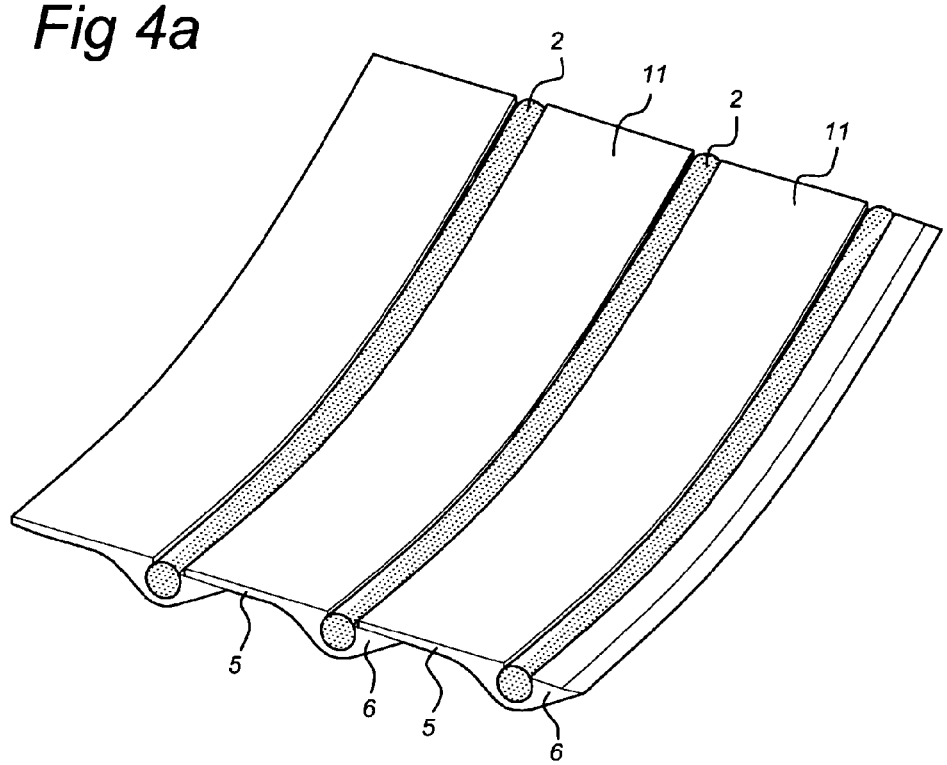

FIG. 4 shows another embodiment of non removable inner liner according to the present invention, the clamp on inner shell. FIG. 4a shows from the inside of the hose, the inner shell when placed on the inner wire 2, and already wound on the mandrel 8. It shows clearly that the centerline of the profile when in place on the inner wire 2 has the same pitch and diameter than the inner wire 2.

Figure 4B:
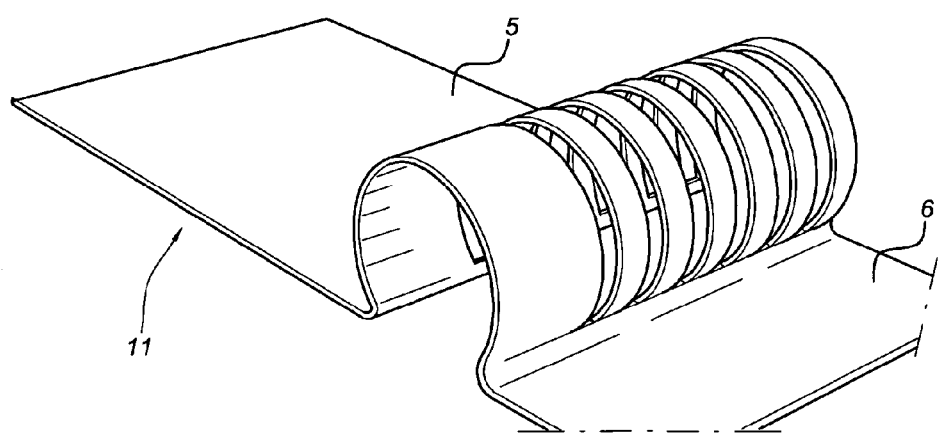

FIG. 4b shows the profile 11 before it is clamped on the inner wire.

In this embodiment, the invention consists of a profile 11 installed along the inner wire 2. This said profile can be made either from bended thin metal plate or extruded or molded composite or plastic material. This said profile 11 can be clipped (snapped) eventually over molded along the inner wire 2; it is therefore referred as the "clipsable" inner shell.

This inner liner is reducing pressure drop of the transfer hose by adding a smoother internal geometry into the hose partially or totally covering (hiding) the initial hose construction geometry, without loosing its flexibility and extension properties, thus reducing the wall friction and reducing the pressure drop.

As shown in FIG. 4a the section of this profile is characterized by the fact that its geometry self recovers from pitch to pitch even when this pitch is changing creating continuous inner shell where the wall friction is consequently significantly reduced. Further as the overlapping flanges (5, 6) are slidable one with regards to the other, the flexibility of the inner composite hose is maintained.

Figure 6:
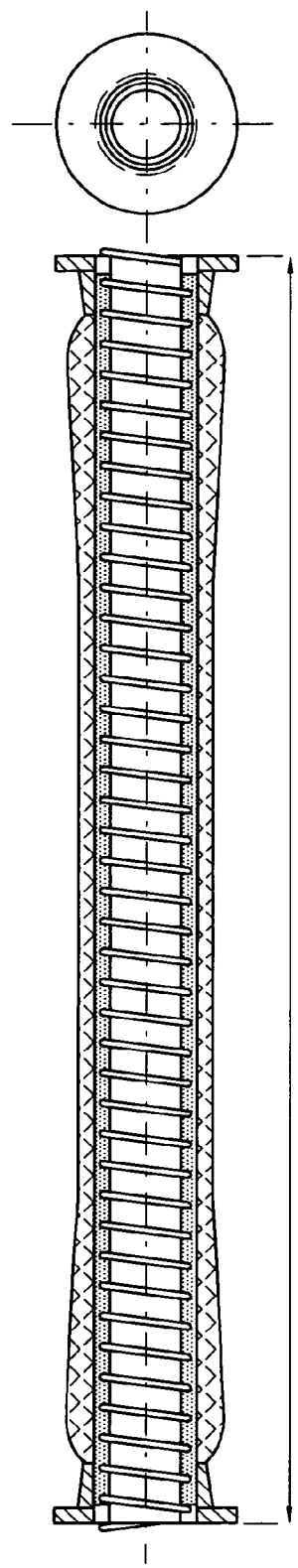
FIG. 6 shows a longitudinal cross-sectional view of a cryogenic transfer hose of the present invention including an optical fiber for cryogenic leak detection system.

FIGS. 5a-5i show different steps in the manufacturing process of a co-axial cryogenic transfer hose assembly using a fibrous insulating material as well as optical fibers for leak detection in the annular gap between the inner and outer hose according to the present invention. FIG. 5a shows an inner hose 12 that has been fabricated following the aforementioned steps mounted on the mandrel 8. In FIG. 1b there is shown an inner hose assembly with a fibrous insulating material 13 wrapped around it. Additional stiffeners or spacers 14 made for example of compact fibrous felt material or polymeric rings and with a diameter smaller than the inner diameter of the outer hose can be placed at regular intervals on top, within or under the fibrous fleece material 13 in a way to keep the insulation layer continuous on the whole hose segment length as shown in FIG. 5c. Further, the spacer or stiffeners 14 are shaped in a way such that it is possible to incorporate static insulation material within the spacer members (not shown). The coupling flanges 15, 15' project in an axial direction from the insulation material 13 such as to be accessible for coupling. Once the insulation material and the stiffeners are installed, an optical fiber cable is wrapped on top of the insulation layer 13 (and passing through slots in the stiffeners) as shown in FIG. 6. At each end of the hose, the fiber will have connectors so that when hoses are assembled together, a continuous detecting fiber can be available. In one preferred embodiment according to the present invention, the optical fiber used is a distributed sensing system i.e. a distributed temperature or pressure sensing system that enables to get a distributed temperature or pressure measurement along the cable. Further, in order to facilitate the assembly of different hose segments together in order to assemble a complete cryogenic hose-in-hose, there is provided in the annular gap 32 a tensioning mechanism or sprung cable mechanism (not shown) comprising tensioning means such as a combination of retractable reels and spring. This mechanism enables to pull the end part of the optical fiber cable from the fiber's connector of one hose segment to the fiber's connector of its adjacent hose segment. Once both fibers' connectors are connected, the cable can retract. In this way there is no "hanging" cable possibly disturbing the assembly of the two hose parts and the connection between the fiber's connectors is easily made before the assembly of the hose parts is made. For redundancy reasons, it is an option to wrap on the insulation layer two or three individual fiber cables (if one breaks the other can still work and the system will not have to be stopped for replacement). The fiber cable can also be fitted in a flexible tube so that it can be replaced without disassembling the hose. An airtight sleeve 16 having evacuation connectors (not shown) comprising a valve, is placed around the inner hose 12 (FIG. 5d). The air from the airtight sleeve is then evacuated by the use of an air pump attached to the evacuation connector and creating an underpressure which will result in compressing the insulation layer. Therefore, the whole diameter D is hence reduced d (FIG. 5f) before the assembly is introduced into the outer elastomeric and/or plastic hose 17 using installation means 18 (FIGS. 5h and 5i). Once the inner hose 12 and the insulation layer 13 are installed within the outer hose 17, air is reintroduced into the airtight sleeve 16 via the valve in the evacuation connector. By reintroducing the air, the insulation layer tends to gets its original volume and is then well compressed over the whole length of the hose segment.

In this particular embodiment shown in FIG. 5a-5i, the mandrel is removed once the airtight sleeve is installed and before the air from the airtight sleeve is evacuated. Before evacuating the air from the airtight sleeve the inner hose 12 has to be overpressurized so that its stiffness increases sufficiently for evacuating the air form the airtight sleeve without damaging the shape and structure of the inner hose.

As mentioned previously, the remove of the mandrel 8 is a key issue in the fabrication process of a cryogenic hose. As the hose is tightly fixed on the mandrel it can be very hard and very time consuming to remove the mandrel.

Figure 7C:
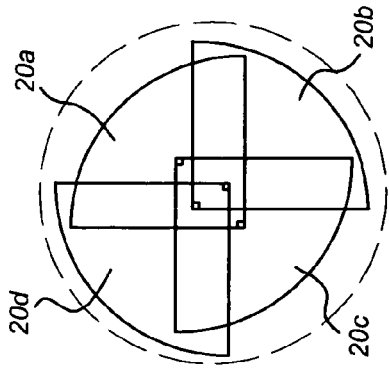
FIG. 7 shows front views of the expandable mandrel in different states.
Figure 7B:
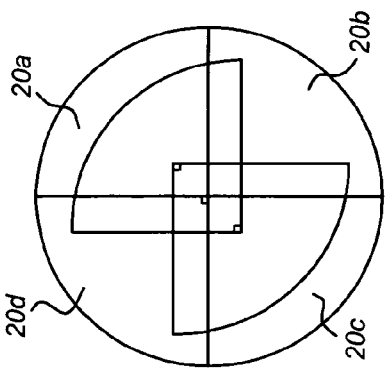
Figure 7A:
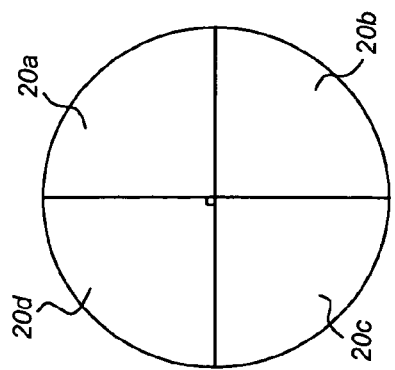

In the embodiment shown in FIG. 7, there is provided an expandable mandrel built in four quarters 20a, 20b, 20c 20d (90° each) that are mechanically connected to some driving mechanism. In normal manufacturing operation the four pieces are positioned so that their surface forms a continuous cylindrical tube on which the hose can be built (FIG. 7a).

When the hose has to be removed from the mandrel the first two quarters 20a and 20c (spaced 180° from each other) move inwards (FIG. 7b), followed by the other two quarters 20b and 20c (FIG. 7c). The overall mandrel diameter is therefore reduced allowing an easy removal operation.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A hose assembly for transfer of cryogenic fluids comprising:
    an inner composite hose for transferring cryogenic fluids, the inner composite hose being comprised of two inner hose segments, a sealing area located between the two inner hose segments, sealing layers, a space between the sealing layers, and end fittings;
    an outer protective hose or sleeve arranged around the inner composite hose in a concentric manner, the outer protective hose comprising at least one of an elastomeric material and a plastic material;
    an annular gap between the inner and outer hoses;
    one or more spacer members bridging the annular gap;
    an insulation layer in the annular gap; and
    a pressure relief system that reliefs an excess of pressure resulting from warming up of a cryogenic transfer system after an offload,
    the pressure relief system comprising i) a pressure relief tube, and ii) a pressure relief and check valve located along the pressure relief tube and situated in the annular gap or integrated in one of the end fittings of the inner hose,
    wherein the pressure relief tube connects, i) the space between sealing layers of the inner hose or the sealing area of the two inner hose segments, respectively to ii) the annular space or a flow path of the inner hose, via the pressure relief or check valve, respectively.

2. The hose assembly for transfer of cryogenic fluids according to claim 1, wherein the pressure relief tube connects the space between sealing layers of the inner hose to the annular space, via the pressure relief and check valve, thereby leading excess of pressure from the space between sealing layers of the inner hose into the annular gap.

3. The hose assembly for transfer of cryogenic fluids according to claim 2, wherein the one or more spacer members bridging the annular gap between the inner and outer hoses are placed on top of the insulation layer such that the insulation layer is kept continuous on the whole hose segment length.

4. The hose assembly for transfer of cryogenic fluids according to claim 2, wherein the one or more spacer members bridging the annular gap between the inner and outer hoses incorporate static insulation material within said one or more spacer members.

5. The hose assembly for transfer of cryogenic fluids according to claim 1, wherein the pressure relief tube connects the sealing area of the two inner hose segments to the the flow path of the inner hose, via the pressure relief and check valve, thereby leading excess of pressure from the sealing area into the flow path of the inner hose.

6. The hose assembly for transfer of cryogenic fluids according to claim 5, wherein the one or more spacer members bridging the annular gap between the inner and outer hoses are placed on top of the insulation layer such that the insulation layer is kept continuous on the whole hose segment length.

7. The hose assembly for transfer of cryogenic fluids according to claim 5, wherein the one or more spacer members bridging the annular gap between the inner and outer hoses incorporate static insulation material within said one or more spacer members.

8. The hose assembly for transfer of cryogenic fluids according to claim 1, wherein the one or more spacer members bridging the annular gap between the inner and outer hoses are placed on top of the insulation layer such that the insulation layer is kept continuous on the whole hose segment length.

9. The hose assembly for transfer of cryogenic fluids according to claim 1, wherein the one or more spacer members bridging the annular gap between the inner and outer hoses incorporate static insulation material within said one or more spacer members.

10. A hose assembly for transfer of cryogenic fluids comprising:
an inner composite hose, for transferring cryogenic fluids, comprised of two inner hose segments, a sealing area located between the two inner hose segments, sealing layers, a space between the sealing layers, and end fittings;
an outer protective hose concentrically arranged around the inner composite hose, the outer protective hose comprising at least one of an elastomeric material and a plastic material;
an annular gap between the inner and outer hoses;
a spacer member bridging the annular gap; and
a pressure relief system that reliefs an excess of pressure,
the pressure relief system comprising i) a pressure relief tube, and ii) a pressure relief valve located along the pressure relief tube,
wherein the pressure relief tube connects the space between sealing layers of the inner hose to the annular space, via the pressure relief valve, thereby leading excess of pressure from the space between sealing layers of the inner hose into the annular gap.

11. A hose assembly for transfer of cryogenic fluids comprising:
an inner composite hose, for transferring cryogenic fluids, comprised of two inner hose segments, a sealing area located between the two inner hose segments, sealing layers, a space between the sealing layers, and end fittings;
an outer protective hose concentrically arranged around the inner composite hose, the outer protective hose comprising at least one of an elastomeric material and a plastic material;
an annular gap between the inner and outer hoses;
a spacer member bridging the annular gap; and
a pressure relief system that reliefs an excess of pressure,
the pressure relief system comprising i) a pressure relief tube, and ii) a pressure relief valve located along the pressure relief tube,
the pressure relief tube connects the sealing area of the two inner hose segments to the the flow path of the inner hose, via the pressure relief valve, thereby leading excess of pressure from the sealing area into the flow path of the inner hose.

* * * * *

UNITED STATES PATENT AND TRADEMARK OFFICE
CERTIFICATE OF CORRECTION

PATENT NO. : 9,291,289 B2
APPLICATION NO. : 13/256744
DATED : March 22, 2016
INVENTOR(S) : Jean-Pierre Queau et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this
Fourteenth Day of June, 2016

Michelle K. Lee
*Director of the United States Patent and Trademark Office*